(12) United States Patent
Thevasahayam

(10) Patent No.: US 9,926,480 B2
(45) Date of Patent: Mar. 27, 2018

(54) INORGANIC-ORGANIC POLYMER NANOCOMPOSITES AND METHODS FOR THEIR PREPARATION AND USE

(71) Applicant: Empire Technology Development LLC, Wilmington, DE (US)

(72) Inventor: Arockiadoss Thevasahayam, Tamilnadu (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 491 days.

(21) Appl. No.: 14/524,690

(22) Filed: Oct. 27, 2014

(65) Prior Publication Data
US 2015/0118471 A1 Apr. 30, 2015

(30) Foreign Application Priority Data

Oct. 28, 2013 (IN) .......................... 4853/CHE/2013

(51) Int. Cl.
*C09K 5/08* (2006.01)
*F25B 21/00* (2006.01)

(52) U.S. Cl.
CPC ................ *C09K 5/08* (2013.01); *F25B 21/00* (2013.01); *Y02B 30/66* (2013.01); *Y02P 20/124* (2015.11)

(58) Field of Classification Search
None
See application file for complete search history.

(56) References Cited

U.S. PATENT DOCUMENTS

| 6,337,370 | B1* | 1/2002 | Bae | ........................... C08F 8/42 |
| | | | | 524/266 |
| 2003/0114568 | A1* | 6/2003 | Sato | ....................... B82Y 30/00 |
| | | | | 524/431 |
| 2007/0293615 | A1* | 12/2007 | Nakashima | ............. C08L 75/04 |
| | | | | 524/407 |
| 2010/0215555 | A1* | 8/2010 | Jin | ....................... B01J 35/0006 |
| | | | | 422/222 |

OTHER PUBLICATIONS

Epstein, R. I. et al., "Observation of laser-induced fluorescent cooling of a solid," Nature, vol. 377, pp. 500-503 (1995).
Patterson, M. et al., "Model of laser-induced temperature changes in solid-state optical refrigerators," J. Appl. Phys., vol. 107, pp. 063108-1 through 063108-9 (2010).
Seletskiy, D. V. et al., "Local laser cooling of Yb: YLF to 110 K," Optics Express, vol. 19, No. 19, pp. 18229-18236 (2011).
Zhang, J. et al., "Laser cooling of a semiconductor by 40 kelvin," Nature, vol. 493, pp. 504-508 (Jan. 24, 2013).

\* cited by examiner

*Primary Examiner* — Tahseen N Khan
(74) *Attorney, Agent, or Firm* — Maschoff Brennan

(57) ABSTRACT

Inorganic-organic polymer nanocomposites are provided. The inorganic-organic polymer nanocomposite includes a polymeric matrix and a plurality of metal nanoparticles embedded within the polymeric matrix. The plurality of metal nanoparticles are configured to provide cooling of the nanocomposite upon exposure to photoradiation.

24 Claims, 6 Drawing Sheets

INORGANIC-ORGANIC POLYMER NANOCOMPOSITES AND METHODS FOR THEIR PREPARATION AND USE

CROSS-REFERENCE TO RELATED APPLICATION

This application claims the benefit under 35 U.S.C. § 119 of Indian Patent Application No. 4853/CHE/2013, filed on Oct. 28, 2013, the content of which is hereby incorporated by reference in its entirety.

BACKGROUND

Conventional cooling and refrigeration systems are based on energy intensive vapor compression methods. Such systems use chemicals such as chlorofluorocarbon (CFC), hydrochlorofluorocarbon (HCFC) and propane. Such chemicals can be harmful and can cause stratospheric ozone depletion. The cooling and refrigeration systems also use carbon dioxide as a refrigerant. Such systems have to withstand relatively high pressures and may result in heavy and expensive apparatus. Other refrigeration systems based on thermo-electrics are relatively expensive. Further, magnetic and acoustic based cooling systems are not flexible and are energy intensive.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

Briefly, in accordance with one aspect, an inorganic-organic polymer nanocomposite is provided. The inorganic-organic polymer nanocomposite includes a polymeric matrix and a plurality of metal nanoparticles embedded within the polymeric matrix. The plurality of metal nanoparticles are configured to provide cooling of the nanocomposite upon exposure to photoradiation.

In accordance with another aspect, an inorganic-organic polymer nanocomposite is provided. The inorganic-organic polymer nanocomposite includes a polyvinyl alcohol-chitosan film and a plurality of titanium tetra isopropoxide $[Ti\{OCH(CH_3)_2\}_4]$ nanoparticles embedded within the polyvinyl alcohol-chitosan film. The plurality of titanium tetra isopropoxide nanoparticles are configured to provide cooling of the polyvinyl alcohol-chitosan film upon exposure to photoradiation.

In accordance with another aspect, a method of forming an inorganic-organic polymer nanocomposite is provided. The method includes mixing a polyvinyl alcohol (PVA) solution, a titanium tetra isopropoxide solution and chitosan to form a mixture. The method also includes drying the mixture to form the inorganic-organic polymer nanocomposite.

In accordance with another aspect, a method of cooling an inorganic-organic polymer nanocomposite is provided. The method includes providing an inorganic-organic polymer nanocomposite. The inorganic-organic polymer nanocomposite includes a polymeric matrix having a plurality of metal nanoparticles embedded therein. The method also includes exposing the inorganic-organic polymer nanocomposite to photoradiation to cool the inorganic-organic polymer nanocomposite.

In accordance with another aspect, a system for regulating temperature of an object is provided. The system includes an inorganic-organic polymer nanocomposite placed proximate to an object. The inorganic-organic polymer nanocomposite includes a polymeric matrix with a plurality of metal nanoparticles embedded therein. The system also includes a photoradiation source configured to apply photoradiation to the inorganic-organic polymer nanocomposite to reduce a temperature of the inorganic-organic polymer nanocomposite to regulate the temperature of the object.

DETAILED DESCRIPTION

Figure 1:
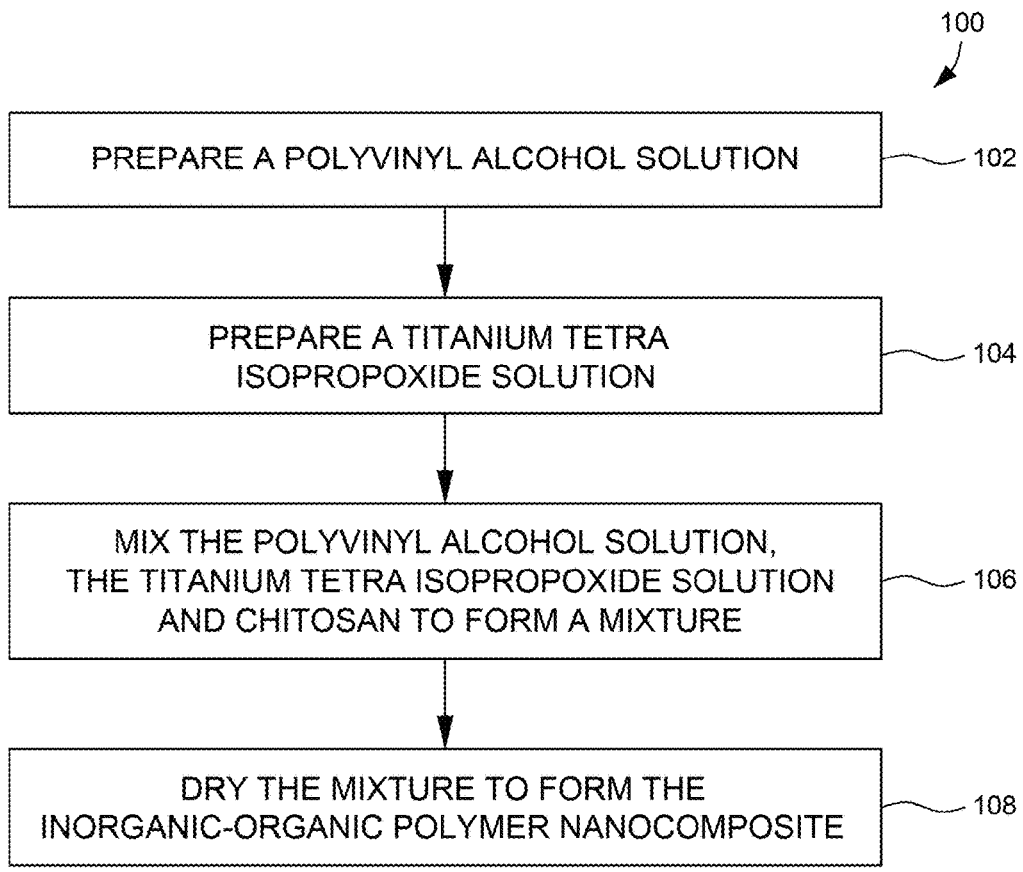
FIG. 1 is an example flow diagram of an embodiment of a method of forming an inorganic-organic polymer nanocomposite.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

Some embodiments are generally directed to techniques of forming inorganic-organic polymer nanocomposites. The technique provides a simple and cost effective process of forming inorganic-organic polymer nanocomposites that exhibit a cooling effect upon exposure to photoradiation. In some embodiments, the inorganic-organic polymer nanocomposites include metal nanoparticles embedded within a polymeric matrix. Optical irradiation and spontaneous anti-Stoke emission in such nanocomposites lead to cooling of such materials. The inorganic-organic polymer nanocomposites formed using this technique may be used for variety of applications such as packaging materials, refrigeration systems, air-cooling systems, and photo-cooling fabrics.

Referring now to FIG. 1, an example flow diagram 100 of an embodiment of a method of forming an inorganic-organic polymer nanocomposite is illustrated. The inorganic-organic polymer nanocomposite includes a plurality of metal nanoparticles embedded within a polymeric matrix. In this example, the inorganic-organic polymer nanocomposite includes a plurality of titanium tetra isopropoxide (Ti{OCH $(CH_3)_2\}_4$) nanoparticles embedded within a polyvinyl alcohol-chitosan film.

At block 102, a polyvinyl alcohol (PVA) solution is prepared. In this example, PVA is mixed with warm water to form the PVA solution. The temperature of the water can generally be any temperature, and the concentration of polyvinyl alcohol in the solution can generally be any concentration. In some examples, a temperature of the water is maintained at about 45° C. to about 50° C. Specific examples of the temperature include about 45° C., about 46° C., about 47° C., about 48° C., about 49° C., about 50° C. and ranges between any two of these values (including endpoints). In one example embodiment, the concentration of the polyvinyl alcohol is about 3 weight percentage (wt %) to about 7 wt %. Specific examples of the polyvinyl alcohol concentration include about 3 wt %, about 4 wt %, about 5 wt %, about 6 wt %, about 7 wt % and ranges between any two of these values (including endpoints).

At block 104, a titanium tetra isopropoxide solution is prepared. In this example, titanium tetra isopropoxide is mixed with water to form the titanium tetra isopropoxide solution. The concentration of titanium tetra isopropoxide in the solution can generally be any concentration. In one example embodiment, the concentration of titanium tetra isopropoxide is about 3 weight percentage (wt %) to about 7 wt %. Specific examples of the titanium tetra isopropoxide concentration include about 3 wt %, about 4 wt %, about 5 wt %, about 6 wt %, about 7 wt % and ranges between any two of these values (including endpoints).

At block 106, the polyvinyl alcohol solution, the titanium tetra isopropoxide solution and chitosan are combined or mixed to form a mixture. The concentration of chitosan in the mixture can generally be any concentration. In one example embodiment, the concentration of chitosan present in the mixture is about 3 wt % to about 7 wt %. Specific examples of the concentration of chitosan include about 3 wt %, about 4 wt %, about 5 wt %, about 6 wt %, about 7 wt % and ranges between any two of these values (including endpoints).

The polyvinyl alcohol (PVA) solution, the titanium tetra isopropoxide solution, and chitosan can be combined or mixed at generally any temperature and for any period of time. In one example embodiment, the polyvinyl alcohol (PVA) solution, the titanium tetra isopropoxide solution and chitosan are combined or mixed at a temperature of about 50° C. to about 70° C. Specific examples of the temperature include about 50° C., about 55° C., about 60° C., about 65° C., about 70° C., and ranges between any two of these values (including endpoints). In one example, the polyvinyl alcohol (PVA) solution, the titanium tetra isopropoxide solution and chitosan are mixed for a time period of about 5 minutes to about 10 minutes. Specific examples of the mixing time include about 5 minutes, about 6 minutes, about 7 minutes, about 8 minutes, about 9 minutes, about 10 minutes and ranges between any two of these values (including endpoints).

At block 108, the mixture is dried to form the inorganic-organic polymer nanocomposite. The drying can generally be performed at any temperature. In one example embodiment, the mixture is dried at a temperature of about 45° C. to about 55° C. Specific examples of the drying temperature include about 45° C., about 46° C., about 47° C., about 48° C., about 49° C., about 50° C., about 51° C., about 52° C., about 53° C., about 54° C., about 55° C. and ranges between any two of these values (including endpoints). The formed inorganic-organic polymer nanocomposite can optionally be cleaned using an acid such as acetic acid.

Figure 2:
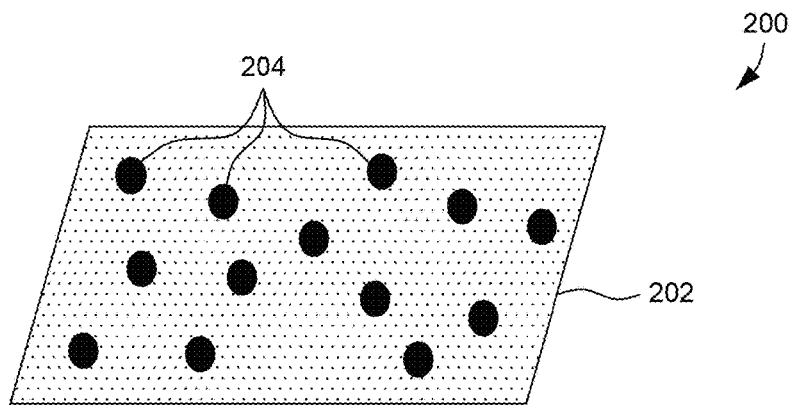
FIG. 2 is an example inorganic-organic polymer nanocomposite.

Referring now to FIG. 2, an example inorganic-organic polymer nanocomposite 200 is illustrated. The inorganic-organic polymer nanocomposite 200 includes a polymeric matrix 202. Examples of materials used for the polymeric matrix 202 include, but are not limited to, polyvinyl alcohol (PVA), polypyrrole (PPy), polypyridine, polypropylene, polyanhydrides, polyphosphazenes, polyphosphoesters, caprolactone polymers, chitosan, collagen, keratine, or combinations thereof.

In this example embodiment, the material used for polymeric matrix is a polyvinyl alcohol-chitosan film. The polyvinyl alcohol can generally be present in the polymeric matrix at any concentration. In one example embodiment, the concentration of polyvinyl alcohol in the polymeric matrix is about 3 weight percentage (wt %) to about 7 wt %. Specific examples of the polyvinyl alcohol concentration in the polymeric matrix 202 include about 3 wt %, about 4 wt %, about 5 wt %, about 6 wt %, about 7 wt % and ranges between any two of these values (including endpoints). The thickness of the polyvinyl alcohol-chitosan film 202 can generally be any thickness. In some examples, a thickness of the polyvinyl alcohol-chitosan film 202 is about 100 micrometers (μm) to about 1000 μm. Specific examples of the thickness of the polyvinyl alcohol-chitosan film 202 include, about 100 μm, about 200 μm, about 300 μm, about 400 μm, about 500 μm, about 600 μm, about 700 μm, about 800 μm, about 900 μm, about 1000 μm and ranges between any two of these values (including endpoints)

The chitosan can generally be present in the polymeric matrix at any concentration. In this example embodiment, the concentration of chitosan in the polymeric matrix 202 is about 1.5 weight percentage (wt %) to about 4.5 wt %. Specific examples of the chitosan concentration in the polymeric matrix 202 include about 1.5 wt %, about 2 wt %, about 2.5 wt %, about 3 wt %, about 3.5 wt %, about 4 wt %, about 4.5 wt % and ranges between any two of these values (including endpoints).

The inorganic-organic polymer nanocomposite 200 includes a plurality of metal nanoparticles 204 embedded within the polymeric matrix 202. Examples of the plurality of metal nanoparticles 204 include, but are not limited to, titanium tetra isopropoxide (Ti{OCH(CH$_3$)$_2$}$_4$) nanoparticles, tantalum penta-i-propoxide (C$_{15}$H$_3$O$_5$Ta) nanoparticles, magnesium isopropoxide (C$_6$H$_{14}$MgO$_2$) nanoparticles, or combinations thereof. The plurality of metal nanoparticles 204 can be present in the inorganic-organic polymer nanocomposite 200 at generally any concentration. In one example embodiment, the plurality of metal nanoparticles 204 are present in the inorganic-organic polymer nanocomposite 200 at a concentration of about 3 weight percentage (wt %) to about 7 wt %. Specific examples of the concentration of the metal nanoparticles 204 in the polymeric matrix 202 include about 3 wt %, about 4 wt %, about 5 wt %, about 6 wt %, about 7 wt % and ranges between any two of these values (including endpoints).

The inorganic-organic polymer nanocomposite 200 with the metal nanoparticles 204 embedded within the polymeric matrix 202 is configured to generate cooling of the nanocomposite 200 upon exposure to photoradiation that will be described in detail with reference to FIG. 4. Such inorganic-organic polymer nanocomposite 200 can be used in a variety of applications such as packaging materials, refrigeration systems, air-cooling systems, and photo-cooling fabrics.

A variety of configurations may be envisaged for the inorganic-organic polymer nanocomposite 200. In one example, the inorganic-organic polymer nanocomposite 200 includes a single layer of polymeric matrix 202 with metal nanoparticles 204 embedded within the polymeric matrix 202. The single layer is folded into two halves to form a folded-layer structure. In another example, the inorganic-organic polymer nanocomposite 200 includes a double layer of polymeric matrix 202 with metal nanoparticles 204 embedded within each of the layers of the polymeric matrix 202. The double layer is folded into two halves to form a double-layered structure. Other configurations with different combinations of the polymeric matrix and the metal nanoparticles may be used to form the inorganic-organic polymer nanocomposite that generates cooling upon exposure to photoradiation.

Figure 3:
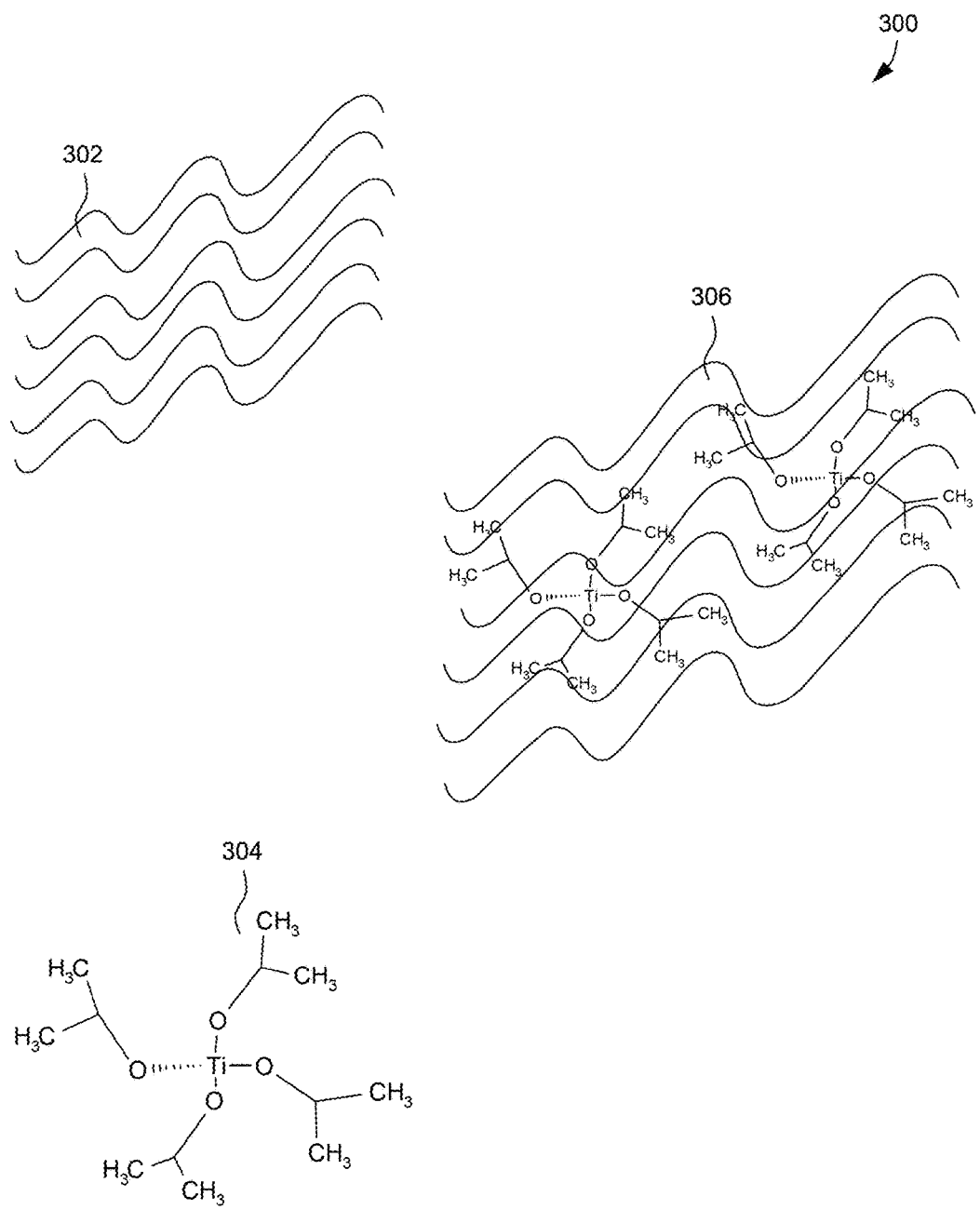
FIG. 3 illustrates an example structure of an inorganic-organic polymer nanocomposite formed using the process of FIG. 1.

FIG. 3 illustrates an example structure 300 of an inorganic-organic polymer nanocomposite formed using the process of FIG. 1. The inorganic-organic polymer nanocomposite includes a polyvinyl alcohol-chitosan film 302 and a plurality of titanium tetra isopropoxide [Ti$\{$OCH(CH$_3$)$_2\}_4$] nanoparticles 304 embedded within the polyvinyl alcohol (PVA)-chitosan film 302 to form an inorganic-organic polymer nanocomposite 306. The formation of intermolecular hydrogen bonds between the amino and hydroxyl groups in chitosan and the hydroxyl groups in PVA with tetra iso-propoxide facilitates miscibility of the chitosan, PVA and titanium tetra iso-propoxide nanoparticles. In this embodiment, the titanium tetra isopropoxide nanoparticles 304 embedded within the polyvinyl alcohol-chitosan film 302 are configured to provide cooling of the polyvinyl alcohol-chitosan film 302 upon exposure to photoradiation. In one example, photoradiation includes solar radiation.

In this example, the polyvinyl alcohol is present in the polyvinyl alcohol-chitosan film 302 at a concentration of about 3 weight percentage (wt %) to about 7 wt %. Specific examples of concentration of PVA in the polyvinyl alcohol-chitosan film 302 include about 3 wt %, about 4 wt %, about 5 wt %, about 6 wt %, about 7 wt % and ranges between any two of these values (including endpoints). Further, the chitosan is present in the polyvinyl alcohol-chitosan film 302 at a concentration of about 3 wt % to about 7 wt %. Specific examples of concentration of chitosan in the polyvinyl alcohol-chitosan film 302 include about 3 wt %, about 4 wt %, about 5 wt %, about 6 wt %, about 7 wt % and ranges between any two of these values (including endpoints).

In this example, the plurality of titanium tetra isopropoxide nanoparticles 304 are present in the inorganic-organic polymer nanocomposite 306 at a concentration of about 3 weight percentage (wt %) to about 7 wt %. Specific examples of concentration of the titanium tetra isopropoxide nanoparticles 304 in the inorganic-organic polymer nanocomposite 306 include about 3 wt %, about 4 wt %, about 5 wt %, about 6 wt %, about 7 wt % and ranges between any two of these values (including endpoints).

In this example embodiment, the titanium tetra isopropoxide nanoparticles 304 embedded within the polyvinyl alcohol-chitosan film 302 are configured to provide cooling of the polyvinyl alcohol-chitosan film 302 upon exposure to photoradiation. Here, the film 302 absorbs photons and emits photons at relatively shorter wavelengths. The energy difference between the absorbed and emitted radiation is supplied by annihilating thermal phonons thereby cooling the transparent film. The cooling effect observed with antistokes cooling by energy transfer can be attributed to propagation of lattice waves induced by vibration of lattice stimulated by incident light. The self-cooling effect of the nanocomposite 306 will be described in a greater detail with reference to FIG. 5.

In some examples, the temperature of the inorganic-organic polymer nanocomposite 306 is reduced by about 10° C. to about 25° C. Specific examples of the reduction in temperature include about 10° C., about 15° C., about 20° C., about 25° C., and ranges between any two of these values (including endpoints).

In this example, the temperature of the inorganic-organic polymer nanocomposite nanocomposite 306 is reduced within generally any time period, such as a time period of about 5 minutes to about 15 minutes of exposure of the nanocomposite to photoradiation. Specific examples of the time include about 5 minutes, about 6 minutes, about 7 minutes, about 8 minutes, about 9 minutes, about 10 minutes, about 11 minutes, about 12 minutes, about 13 minutes, about 14 minutes, about 15 minutes and ranges between any two of these values (including endpoints).

Figure 4:
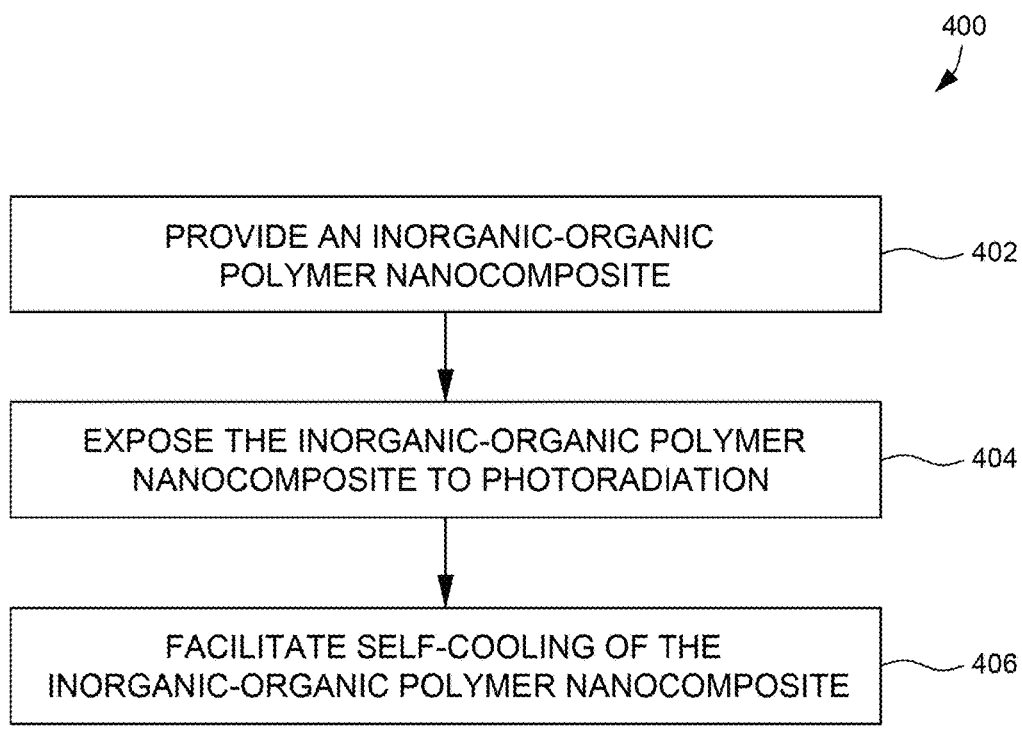
FIG. 4 is an example flow diagram of an embodiment of a method of cooling an inorganic-organic polymer nanocomposite.

Referring now to FIG. 4, an example flow diagram 400 of an embodiment of a method of cooling an inorganic-organic polymer nanocomposite is provided. At block 402, an inorganic-organic polymer nanocomposite is provided. In one example embodiment, the inorganic-organic polymer nanocomposite includes a polymeric matrix having a plurality of metal nanoparticles embedded therein. Examples of materials used for the polymeric matrix include, but are not limited to, polyvinyl alcohol (PVA), polypyrrole (PPy), polypyridine, polypropylene, polyanhydrides, polyphosphazenes, polyphosphoesters, caprolactone polymers, chitosan, collagen, keratine, or combinations thereof.

Examples of the metal nanoparticles include, but are not limited to, titanium tetra isopropoxide (Ti$\{$OCH(CH$_3$)$_2\}_4$) nanoparticles, tantalum penta-i-propoxide ($C_{15}H_3O_5Ta$) nanoparticles, magnesium isopropoxide ($C_6H_{14}MgO_2$) nanoparticles, or combinations thereof. In one example, the inorganic-organic polymer nanocomposite includes titanium tetra isopropoxide (Ti$\{$OCH(CH$_3$)$_2\}_4$) nanoparticles embedded within a polyvinyl alcohol-chitosan film.

At block 404, the inorganic-organic polymer nanocomposite is exposed to photoradiation. The exposure of the inorganic-organic polymer nanocomposite to the photoradiation facilitates self-cooling of the inorganic-organic polymer nanocomposite (block 406). In particular, the metal nanoparticles embedded within the polymeric matrix facilitate the cooling of the inorganic-organic polymer nanocomposite.

In one example, the inorganic-organic polymer nanocomposite is exposed to solar radiation of generally any illuminance value. In some examples, the photoradiation has an illuminance of about 9000 Lux to about 30000 Lux. Specific examples of the photoradiation illuminance include about 9000 Lux, about 12000 Lux, about 15000 Lux, about 18000

Lux, about 21000 Lux, about 24000, about 27000 Lux, about 30000 Lux and ranges between any two of these values (including endpoints).

In this example embodiment, the temperature of the inorganic-organic polymer nanocomposite is reduced by generally any amount, such as about 10° C. to about 25° C. upon exposure to photoradiation. Specific examples of the reduction in temperature include about 10° C., about 15° C., about 20° C., about 25° C. and ranges between any two of these values (including endpoints).

Figure 5:
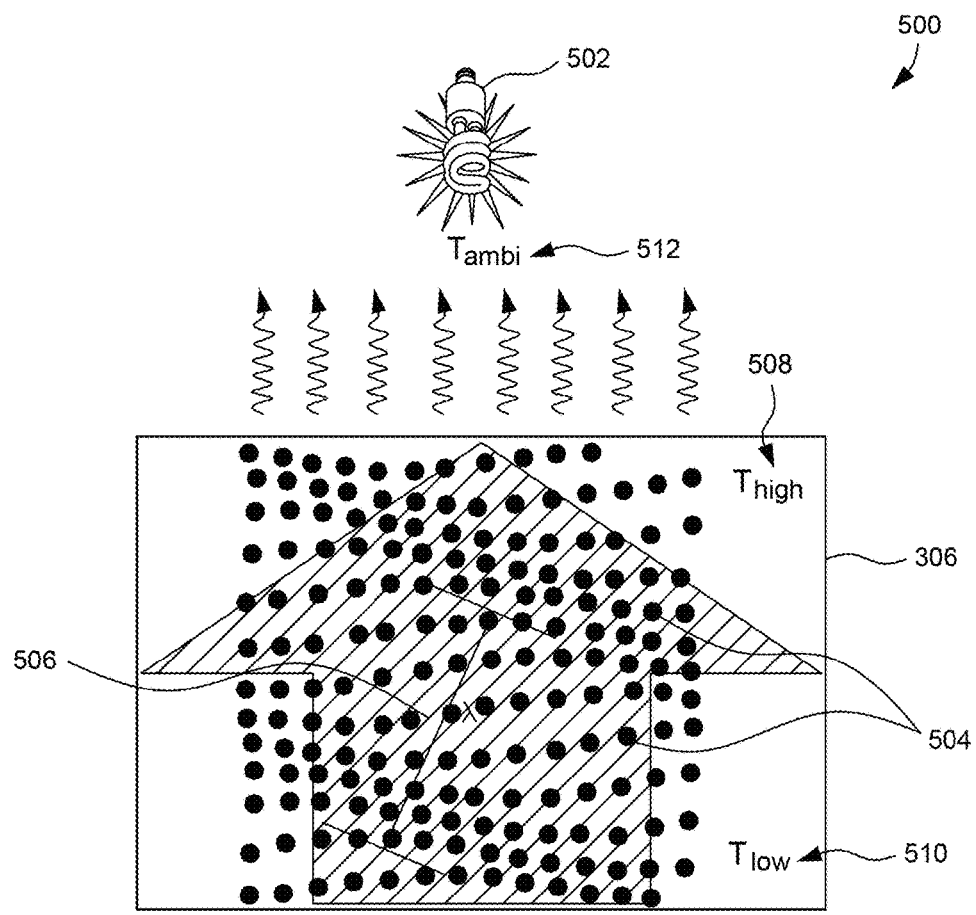
FIG. 5 is a schematic diagram illustrating self-cooling mechanism of the inorganic-organic polymer nanocomposite of FIG. 3.

FIG. 5 is a schematic diagram 500 illustrating self-cooling mechanism of the inorganic-organic polymer nanocomposite 306 of FIG. 3. In this embodiment, the inorganic-organic polymer nanocomposite 306 is exposed to photoradiation using a photoradiation source 502. In this example, the photoradiation source 502 is a compact fluorescent lamp (CFL). In operation, heat propagates through the inorganic-organic polymer nanocomposite 306 via the motion or vibration of atoms and molecules (generally represented by reference numeral 504). It should be noted that in a transparent solid the bonds between the individual atoms behave like springs. As one of the atoms gets pushed or pulled, there may be a wave (or phonon) travelling through the inorganic-organic polymer nanocomposite 306. Further, owing to the connections between the atoms, the displacement of one or more atoms from their equilibrium positions can generate a set of vibration waves (such as represented by reference numeral 506) that propagate through the lattice. Here, an amplitude ($\lambda$) of the wave 506 is estimated using displacements of the atoms from their equilibrium positions and is proportional to the incident energy flux.

In operation, a temperature gradient is generated within the inorganic-organic polymer nanocomposite 306 due to the phonon pumping. The temperature gradient is represented using the high ($T_{high}$) 508 and the low ($T_{low}$) 510 temperatures. The temperature ($T_{high}$) 508 of the top surface of the inorganic-organic polymer nanocomposite 306 is relatively higher than the ambient temperature ($T_{ambient}$) that dissipates heat either through radiation and/or convection when air flow is present. The bottom surface of the inorganic-organic polymer nanocomposite 306 is at a relatively lower temperature ($T_{low}$) 510 and can be used to wrap food or fixed onto a metallic surface such as copper or aluminum to develop a light exposed cooling box. The photo induced cooling of the inorganic-organic polymer nanocomposite 306 attains a steady state with a light source.

In some embodiments, a system for regulating temperature of an object is provided. In this example, an inorganic-organic polymer nanocomposite is placed proximate to an object. The inorganic-organic polymer nanocomposite includes a polymeric matrix with a plurality of metal nanoparticles embedded therein. Examples of the materials used for polymeric matrix include, but are not limited to, polyvinyl alcohol (PVA), polypyrrole (PPy), polypyridine, polypropylene, polyanhydrides, polyphosphazenes, polyphosphoesters, caprolactone polymers, chitosan, collagen, keratine, or combinations thereof. Examples of the plurality of metal nanoparticles include, but are not limited to, titanium tetra isopropoxide ($Ti\{OCH(CH_3)_2\}_4$) nanoparticles, tantalum penta-i-propoxide ($C_{15}H_{35}O_5Ta$) nanoparticles, magnesium isopropoxide ($C_6H_{14}MgO_2$) nanoparticles, or combinations thereof.

The system further includes a photoradiation source configured to apply photoradiation to the inorganic-organic polymer nanocomposite to reduce a temperature of the inorganic-organic polymer nanocomposite. In one example, the photoradiation source includes a solar radiation source. In one example embodiment, the photoradiation includes solar radiation.

In some examples, the photoradiation source is configured to apply photoradiation to the inorganic-organic polymer nanocomposite with generally any illuminance value, such as an illuminance of about 9000 Lux to about 30000 Lux. Specific examples of the photoradiation illuminance include about 9000 Lux, about 12000 Lux, about 15000 Lux, about 18000 Lux, about 21000 Lux, about 24000, about 27000 Lux, about 30000 Lux and ranges between any two of these values (including endpoints). In this example, the temperature of the inorganic-organic polymer nanocomposite is reduced by about 10° C. to about 25° C.

EXAMPLES

The present invention will be described below in further detail with examples and comparative examples thereof, but it is noted that the present invention is by no means intended to be limited to these examples.

Example 1

Formation of Inorganic-organic Polymer Nanocomposite

An inorganic-organic polymer nanocomposite was formed using the example method of FIG. 1. Here, about 5 wt % of polyvinyl alcohol (PVA) (obtained from Nice Chemicals Pvt. Ltd., India) was mixed with de-ionized (DI) water to form a PVA solution. The temperature of the DI water was maintained at about 45° C. to about 50° C. Titanium tetra isopropoxide solution was prepared by mixing 5 wt % of titanium tetra isopropoxide (obtained from Spectra Chemicals Pvt. Ltd., India) with DI water. Further, about 10 milliliter (ml) of the PVA solution and about 5 ml of the titanium tetra isopropoxide solution were mixed with about 10 ml of chitosan (about 3 wt %) by stirring continuously to achieve a homogeneous mixture.

The resultant mixture was then poured in a petri dish and was dried at a temperature of about 50° C. to form an inorganic-organic polymer nanocomposite. The fabricated film was dipped in acetic acid for stabilization. Various nanocomposites having different wt % ratios of the PVA, chitosan and titanium tetra isopropoxide were formed. The details of the composite films are provided in Table 1:

TABLE 1

| Composition: PVA:CHI:Ti {OCH(CH$_3$)$_2$}$_4$ (weight % ratio) | Observations |
| --- | --- |
| 10:10:1 | Good flexible film |
| 10:5:1 | Brittle composite |
| 20:10:1 | Good flexible film |
| 10:20:1 | Rigid film |

Example 2

Characterization of Inorganic-organic Polymer Nanocomposite

Figure 6:
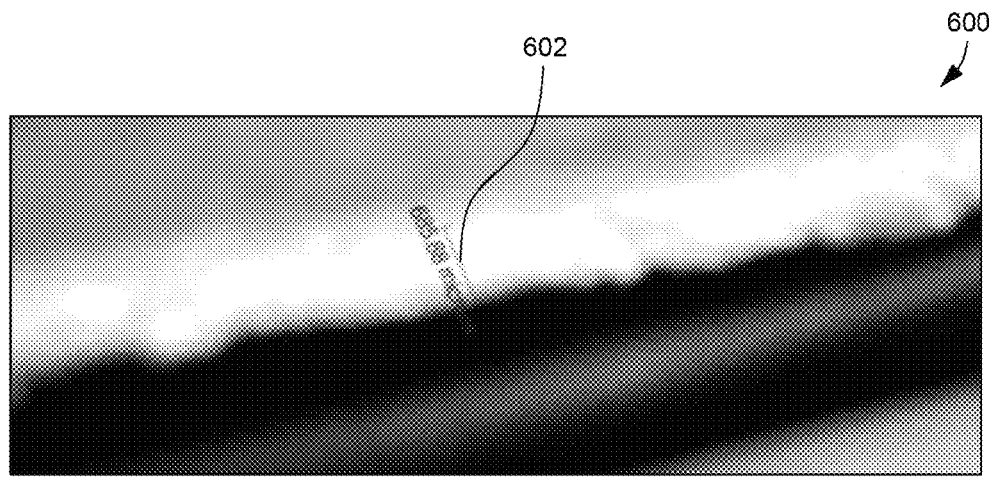
FIG. 6 illustrates an example image of the inorganic-organic polymer nanocomposite.
Figure 7:
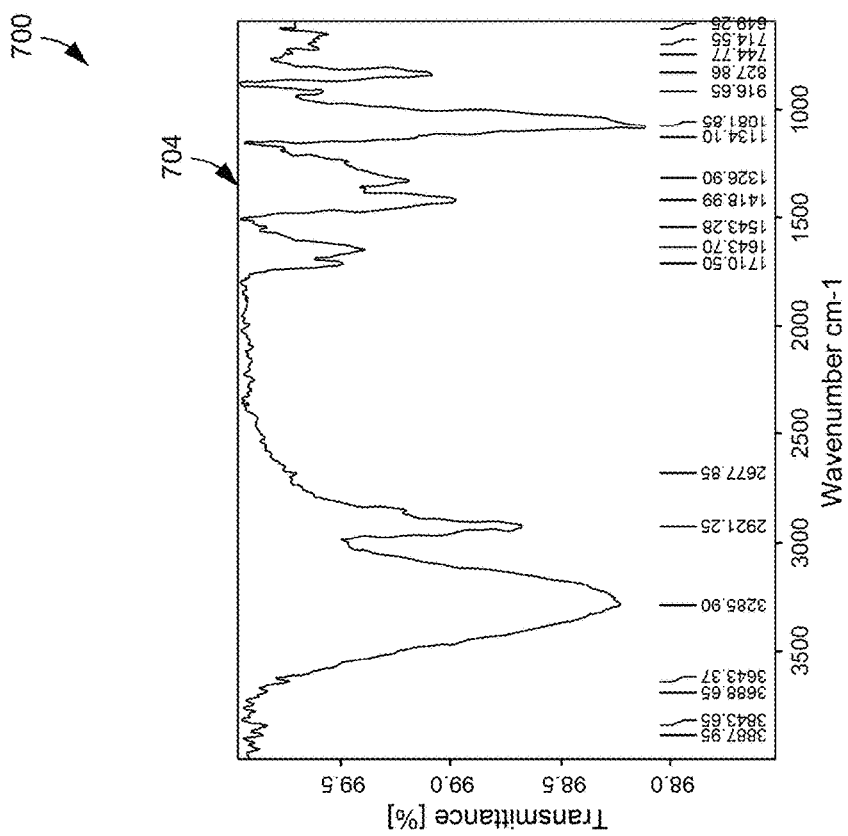
FIG. 7 illustrates example transmission spectra of inorganic-organic polymer nanocomposites having different compositions.
Figure 7:
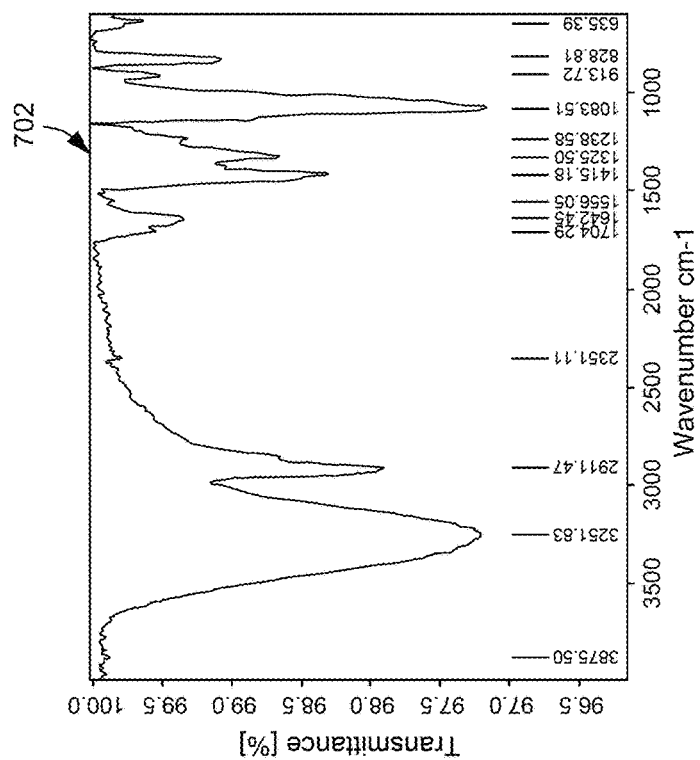

The inorganic-organic polymer nanocomposite of Example 1 was characterized using Zeiss AX4 optical microscope. FIG. 6 illustrates an example image 600 of the inorganic-organic polymer nanocomposite. The thickness (represented by reference numeral 602) of the single layer nanocomposite was estimated to be about 685 μm for a nanocomposite film with a diameter of about 5 centimeters (cm). The sheet resistance and band gap for the film with composition ratio (PVA:CHI:Ti{OCH(CH$_3$)$_2$}$_4$) of about 20:10:1 was measured using a standard four probe method. The sheet resistance and the band gap were estimated to be about 25 ohms per square centimeters ($\Omega$/cm$^2$) and about 4.7 electron volts (eV) respectively.

FIG. 6 illustrates example transmission spectra 700 for inorganic-organic polymer nanocomposites obtained using Fourier transform infrared spectroscopy (FTIR). The transmission spectra of two different nanocomposites of PVA:CHI:Ti{OCH(CH$_3$)$_2$}$_4$ with weight ratio of about 20:10:1 and about 10:10:1 respectively are represented by reference numerals 702 and 704 respectively. The transmission spectra 702 and 704 indicated miscibility between chitosan, PVA and titanium tetra isopropoxide owing to formation of intermolecular hydrogen bonds between the amino and hydroxyl groups in chitosan and the hydroxyl group in PVA with tetra iso-propoxide.

Figure 8:
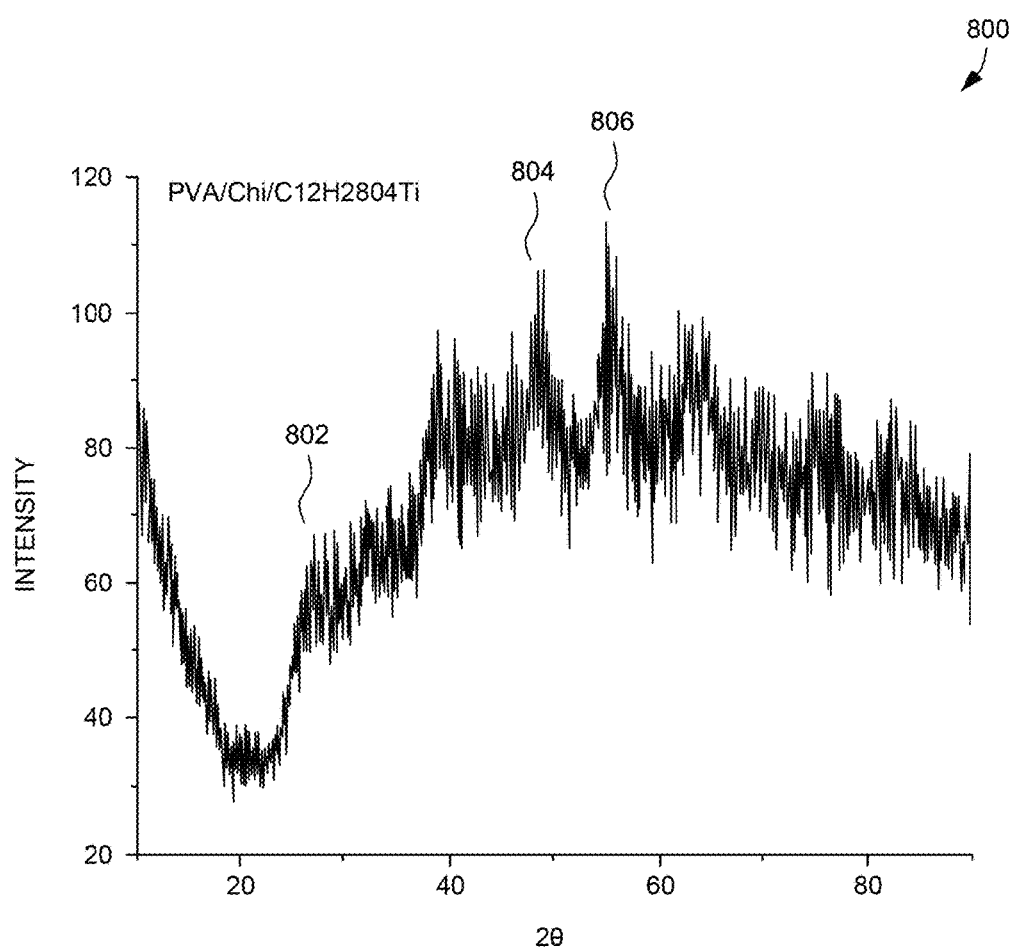
FIG. 8 illustrates an example XRD pattern of an inorganic-organic polymer nanocomposite.

The nanocomposite of Example 1 was further characterized using an X-ray diffraction (XRD) analytical system. FIG. 8 illustrates an example XRD pattern 700 of the inorganic-organic polymer nanocomposite of Example 1. The inorganic-organic polymer nanocomposite with composition ratio (PVA:CHI:Ti{OCH(CH$_3$)$_2$}$_4$) of about 20:10:1 was characterized using the XRD analytical system. As illustrated, a peak 802 corresponding to an angle 2θ of about 27.3 degrees was observed. The peak 802 corresponded to a rutile phase of the titanium. Further, peaks 804 and 806 corresponding to angles of about 48.8 degrees and about 55.2 degrees represented the CH$_4$/O$_2$ groups.

Example 3

Experimental Results for the Inorganic-organic Polymer Nanocomposite Upon Exposure to Solar Radiation Inorganic-organic polymer nanocomposites having different compositions were fabricated using the Example method of FIG. 1. Ten nanocomposites with different compositions and physical parameters were fabricated. The composition details and the physical parameters for the inorganic-organic polymer nanocomposites are provided in Table 2: Here, SL represents a single layer of the inorganic-organic polymer nanocomposite, SLF represents a single layer that is folded into two halves, DL represents a double layer of the inorganic-organic polymer nanocomposite and DLF represents a folded double layer.

TABLE 2

| Composition | Ratio (wt %) | Diameter (cm) | Weight (mg) | Sample Type | Thickness (μm) |
|---|---|---|---|---|---|
| PVA only | — | — | 30 | Sample A | 141 |
| PVA + Chitosan only | — | — | 58 | Sample B | 211 |
| PVA:Chi:Ti{OCH(CH$_3$)$_2$}$_4$ | 10:10:1 | 5 | 110 | Sample C-SL | 685 |
| PVA:Chi:Ti{OCH(CH$_3$)$_2$}$_4$ | 10:10:1 | 5 | 110 | Sample C-SLF | 685 |
| PVA:Chi:Ti{OCH(CH$_3$)$_2$}$_4$ | 10:10:1 | 5 | 138 | Sample C-DL | 753 |
| PVA:Chi:Ti{OCH(CH$_3$)$_2$}$_4$ | 10:10:1 | 5 | 138 | Sample C-DLF | 753 |
| PVA:Chi:Ti{OCH(CH$_3$)$_2$}$_4$ | 20:10:1 | 5 | 156 | Sample D-SL | 685 |
| PVA:Chi:Ti{OCH(CH$_3$)$_2$}$_4$ | 20:10:1 | 5 | 156 | Sample D-SLF | 685 |
| PVA:Chi:Ti{OCH(CH$_3$)$_2$}$_4$ | 20:10:1 | 5 | 190 | Sample D-DL | 806 |
| PVA:Chi:Ti{OCH(CH$_3$)$_2$}$_4$ | 20:10:1 | 5 | 190 | Sample D-DLF | 806 |

The temperature of a bottom surface of above-described samples A and B of inorganic-organic polymer nanocomposite was measured using Samsung Galaxy Tab II in Madurai, India. The nanocomposite samples were exposed to sunlight with illuminance of about 30000 Lux at an ambient temperature of about 35° C. at local time 10:30 AM. The results of the experiment are provided in Table 3:

TABLE 3

| | Samples Temperature (° C.) | |
|---|---|---|
| Time (s) | A | B |
| 0 | 35 | 35 |
| 20 | 36 | 36 |
| 40 | 37 | 37 |
| 60 | 38 | 38 |
| 80 | 39 | 39 |
| 100 | 40 | 40 |
| 120 | 41 | 41 |
| 140 | 42 | 42 |
| 160 | 43 | 43 |
| 180 | 44 | 44 |
| 200 | 45 | 45 |

Control Samples A (containing only PVA) and B (containing PVA and chitosan, but no metal nanoparticles) both increased in temperature over time with exposure to sunlight.

The temperature of a bottom surface of the sample PVA:Chi:Ti{OCH(CH$_3$)$_2$}$_4$ with weight ratio of 10:10:1 of the inorganic-organic polymer nanocomposite was measured using Samsung Galaxy Tab II in Madurai, India. The nanocomposite was exposed to sunlight with illuminance of about 30000 Lux at an ambient temperature of about 35° C. at local time 10:30 AM. The results of the experiment are provided in Table 4:

TABLE 4

| | Exposure to sunlight 30000 Lux; Samples of 10:10:1 (Temperature in ° C.) | | | | Top surface temperature |
|---|---|---|---|---|---|
| Time (s) | C-SL | C-SLF | C-DL | C-DLF | In ° C. |
| 0 | 35 | 35 | 35 | 35 | 35 |
| 20 | 34 | 34 | 34 | 34 | 36 |
| 40 | 33 | 33 | 33 | 33 | 37 |
| 60 | 32 | 32 | 32 | 32 | 38 |
| 80 | 31 | 31 | 31 | 31 | 39 |
| 100 | 30 | 30 | 30 | 30 | 40 |
| 120 | 30 | 29 | 29 | 29 | 41 |
| 140 | 30 | 28 | 28 | 28 | 42 |
| 160 | 30 | 28 | 27 | 27 | 43 |
| 180 | — | 28 | 26 | 26 | 44 |

TABLE 4-continued

| | Exposure to sunlight 30000 Lux; Samples of 10:10:1 (Temperature in ° C.) | | | | Top surface temperature |
|---|---|---|---|---|---|
| Time (s) | C-SL | C-SLF | C-DL | C-DLF | In ° C. |
| 200 | — | 28 | 25 | 25 | 45 |
| 220 | — | — | 25 | 24 | 46 |
| 240 | — | — | 25 | 23 | 47 |
| 260 | — | — | — | 22 | 47 |
| 280 | — | — | — | 21 | 48 |
| 300 | — | — | — | 21 | 48 |

The temperature for the bottom of the sample PVA:Chi:Ti{OCH(CH$_3$)$_2$}$_4$ with weight ratio of 20:10:1 of the inorganic-organic polymer nanocomposite was measured using Samsung Galaxy Tab II in Madurai, India. The nanocomposite was exposed to sunlight with illuminance of about 30000 Lux at an ambient temperature of about 35° C. at local time 10:30 AM. The results of the experiment are provided in Table 5:

TABLE 5

| | Exposure to sunlight 30000 Lux; Samples of 20:10:1 (Temperature in ° C.) | | | | Top surface temperature |
|---|---|---|---|---|---|
| Time (s) | D-SL | D-SLF | D-DL | D-DLF | In ° C. |
| 0 | 35 | 35 | 35 | 35 | 35 |
| 20 | 34 | 34 | 34 | 34 | 36 |
| 40 | 33 | 33 | 33 | 33 | 37 |
| 60 | 32 | 32 | 32 | 32 | 38 |
| 80 | 31 | 31 | 31 | 31 | 39 |
| 100 | 30 | 30 | 30 | 30 | 40 |
| 120 | 29 | 29 | 29 | 29 | 41 |
| 140 | 28 | 28 | 28 | 28 | 42 |
| 160 | 27 | 27 | 27 | 27 | 43 |
| 180 | 26 | 26 | 26 | 26 | 44 |
| 200 | 26 | 25 | 25 | 25 | 45 |
| 220 | 26 | 24 | 24 | 24 | 46 |
| 240 | 26 | 23 | 23 | 23 | 47 |
| 260 | 26 | 23 | 22 | 22 | 47 |
| 280 | — | 23 | 21 | 21 | 47 |
| 300 | — | 22 | 20 | 20 | 48 |
| 320 | — | 22 | 19 | 19 | 48 |
| 340 | — | 22 | 19 | 18 | 48 |
| 360 | — | 22 | 19 | 17 | 48 |
| 380 | — | 22 | 19 | 16 | 48 |
| 400 | — | — | — | 15 | 49 |
| 420 | — | — | — | 14 | 49 |
| 440 | — | — | — | 13 | 49 |
| 460 | — | — | — | 12 | 49 |
| 480 | — | — | — | 11 | — |
| 500 | — | — | — | 10 | — |

Example 4

Experimental Results for the Inorganic-organic Polymer Nanocomposite as a Packaging Material The inorganic-organic polymer nanocomposite of Example 1 was used as a packaging material and was used to wrap a commercially available chocolate bar. The chocolate bar was wrapped with the sample DSL having the composition as provided in Table 1. The temperature of each of the interior surface and the exterior surface of the inorganic-organic polymer nanocomposite was measured using thermocouples. The results of the experiment are provided below in Table 6.

TABLE 6

| | Samples - D-SL | | |
|---|---|---|---|
| Time (s) | Sunlight (~10AM and noon) (Temperature in ° C.) | | 25 W; CFL |
| 0 | 30000 lux | 47000 lux | 9000 lux |
| 20 | 36 | 36 | 36 |
| 40 | 36 | 35 | 35 |
| 60 | 36 | 35 | 35 |
| 80 | 36 | 34 | 34 |
| 100 | 36 | 34 | 34 |
| 120 | 36 | 34 | 33 |
| 140 | 36 | 34 | 33 |
| 160 | 36 | 34 | 32 |
| 180 | 36 | 34 | 32 |
| 200 | 36 | 34 | 31 |
| 220 | 36 | 34 | 31 |

As can be seen, the temperature of the inorganic-organic polymer nanocomposite was observed to be substantially same when the wrapped chocolate was exposed to sunlight. The inorganic-organic polymer nanocomposite on exposure to solar radiation absorbed visible energy and was observed to be transparent to infrared radiation. Further, the infrared radiation that was trapped within the inorganic-organic polymer nanocomposite increased heat, which was offset by the cooling effect achieved due to light induced cooling. The temperature of the inorganic-organic polymer nanocomposite was observed to be substantially same at an illuminance value of about 30000 lux while the temperature was observed to be decreased at illuminance value of about 47000 (Noon). Moreover, as the inorganic-organic polymer nanocomposite was exposed to CFL, a significant reduction in temperature of the inorganic-organic polymer nanocomposite was observed as the infrared radiation was negligible.

As can be seen, the exposure to sunlight facilitates substantial reduction in temperature of the nanocomposite providing self-cooling of the inorganic-organic polymer nanocomposite. As can be seen, the photo-cooling effect of the nanocomposite is due to the titanium tetra isopropoxide nanoparticles embedded in the nanocomposite, as control samples A and B increased in temperature instead of decreased in temperature. The cooling effect of the inorganic-organic polymer nanocomposite increases as the illuminance of the applied photoradiation is increased. Moreover, it was also observed that higher concentration of the PVA relative to concentration of chitosan and titanium tetra isopropoxide nanoparticles in the nanocomposite resulted in better cooling efficiency. This enhanced performance is due at least in part to relatively greater more space for lattice vibration resulting in increased anti-stokes phonon transport to reduce temperature of the nanocomposite.

Further, additional experiments were carried out by illuminating the inorganic-organic polymer nanocomposite of Example 1 with fluorescent light using a commercially available compact fluorescent lamp (CFL). The CFL had illuminance values of about 1000 Lux and 9000 Lux and power of about 5 Watt (W) and 25 W. The exposure of inorganic-organic polymer nanocomposite to the fluorescent light facilitated reduction in the temperature of the composite specifically at substantially high values of illuminance. It was also observed that the sample PVA:Chi:Ti{OCH(CH$_3$)$_2$}$_4$ with a weight ratio of about 20:10:1 provided enhanced cooling efficiency owing to available space for lattice vibration that resulted in anti-stokes phonon transport to reduce temperatures of the composite.

The inorganic-organic polymer nanocomposite materials described above may be used for packaging materials and as cooling elements in air conditioning and other cooling systems. In certain examples, the inorganic-organic polymer nanocomposite may be used for packaging food. In another example, the inorganic-organic polymer nanocomposite may be attached to a metallic surface such as copper or aluminum surface to form a cooling container. The nanocomposite materials facilitate effective regulation of temperature of objects/environment owing to their self-cooling properties. Further, such systems are compact, flexible, easy to manufacture, and can use ambient energy source to provide the desired level of cooling.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An inorganic-organic polymer nanocomposite comprising:
   a polymeric matrix; and
   a plurality of metal nanoparticles embedded within the polymeric matrix, wherein the plurality of metal nanoparticles comprises a plurality of titanium tetra isopropoxide ($Ti\{OCH(CH_3)_2\}_4$) nanoparticles, a plurality of tantalum penta-i-propoxide ($C_{15}H_{35}O_5Ta$) nanoparticles, a plurality of magnesium isopropoxide ($C_6H_{14}MgO_2$) nanoparticles, or combinations thereof, and wherein the plurality of metal nanoparticles are configured to provide cooling of the nanocomposite upon exposure to photoradiation.

2. The inorganic-organic polymer nanocomposite of claim 1, wherein the plurality of metal nanoparticles are present in the inorganic-organic polymer nanocomposite at a concentration of about 3 weight percentage (wt %) to about 7 wt %.

3. The inorganic-organic polymer nanocomposite of claim 1, wherein the inorganic-organic polymer nanocomposite is configured for use as a cooling element in a packaging material, a refrigeration system, an air-cooling system, photo-cooling fabrics or combinations thereof.

4. The inorganic-organic polymer nanocomposite of claim 1, wherein the inorganic-organic polymer nanocomposite comprises a single layer of polymeric matrix with metal nanoparticles embedded within the polymer matrix, and wherein the single layer is folded into two halves.

5. The inorganic-organic polymer nanocomposite of claim 1, wherein the inorganic-organic polymer nanocomposite comprises a double layer of polymeric matrix with metal nanoparticles embedded within each of the layers, and wherein the double layer is folded into two halves.

6. The inorganic-organic polymer nanocomposite of claim 1, wherein the inorganic-organic polymer nanocomposite comprises a plurality of layers of the polymeric matrix with metal nanoparticles embedded within each of the layers.

7. The inorganic-organic polymer nanocomposite of claim 1, wherein the polymer matrix comprises polyvinyl alcohol (PVA), polypyrrole (PPy), polypyridine, polypropylene, polyanhydrides, polyphosphazenes, polyphosphoesters, caprolactone polymers, chitosan, collagen, keratin, or combinations thereof.

8. The inorganic-organic polymer nanocomposite of claim 7, wherein the polymeric matrix comprises a polyvinyl alcohol-chitosan film.

9. The inorganic-organic polymer nanocomposite of claim 8, wherein the polyvinyl alcohol is present in the polymeric matrix at a concentration of about 3 weight percentage (wt %) to about 7 wt %.

10. The inorganic-organic polymer nanocomposite of claim 8, wherein the chitosan is present in the polymeric matrix at a concentration of about 1.5 wt % to about 4.5 wt %.

11. An inorganic-organic polymer nanocomposite comprising:
a polyvinyl alcohol-chitosan film; and
a plurality of titanium tetra isopropoxide [Ti{OCH(CH$_3$)$_2$}$_4$] nanoparticles embedded within the polyvinyl alcohol-chitosan film, wherein the plurality of titanium tetra isopropoxide nanoparticles are configured to provide cooling of the polyvinyl alcohol-chitosan film upon exposure to photoradiation having an illuminance of about 9000 Lux to about 30000 Lux.

12. The inorganic-organic polymer nanocomposite of claim 11, wherein the polyvinyl alcohol is present at a concentration of about 3 weight percentage (wt %) to about 7 wt % and chitosan is present at a concentration of about 3 wt % to about 7 wt % in the polyvinyl alcohol-chitosan film.

13. The inorganic-organic polymer nanocomposite of claim 11, wherein the plurality of titanium tetra isopropoxide nanoparticles are present in the inorganic-organic polymer nanocomposite at a concentration of about 3 wt % to about 7 wt %.

14. The inorganic-organic polymer nanocomposite of claim 11, wherein the polyvinyl alcohol-chitosan film has a thickness of about 100 micrometers (µm) to about 1000 µm.

15. The inorganic-organic polymer nanocomposite of claim 11, wherein the temperature of the nanocomposite of the inorganic-organic polymer nanocomposite is reduced by about 10° C. to about 25° C. within about 5 minutes to about 15 minutes of exposure to photoradiation.

16. A method of forming an inorganic-organic polymer nanocomposite, the method comprising:
mixing a polyvinyl alcohol (PVA) solution, a titanium tetra isopropoxide solution and chitosan to form a mixture; and
drying the mixture to form the inorganic-organic polymer nanocomposite.

17. The method of claim 16, wherein mixing is carried out at a temperature of about 50° C. to about 70° C. and for a period of about 5 to 10 minutes and drying is carried out at about 45° C. to about 55° C.

18. The method of claim 16, wherein the polyvinyl alcohol (PVA) solution, a titanium tetra isopropoxide solution and chitosan are mixed for a time period of about 5 minutes to about 10 minutes.

19. A method of cooling an inorganic-organic polymer nanocomposite, the method comprising:
providing an inorganic-organic polymer nanocomposite, wherein the inorganic-organic polymer nanocomposite comprises a polymeric matrix having a plurality of metal nanoparticles embedded therein, wherein the plurality of metal nanoparticles comprises a plurality of titanium tetra isopropoxide (Ti{OCH(CH$_3$)$_2$}$_4$) nanoparticles, a plurality of tantalum penta-i-propoxide (C$_{15}$H$_3$O$_5$Ta) nanoparticles, a plurality of magnesium isopropoxide (C$_6$H$_{14}$MgO$_2$) nanoparticles, or combinations thereof; and
exposing the inorganic-organic polymer nanocomposite to photoradiation to cool the inorganic-organic polymer nanocomposite.

20. The method of claim 19, comprising applying a photoradiation of illuminance in a range of about 9000 Lux to 30000 Lux.

21. The method of claim 19, wherein exposing the inorganic-organic polymer nanocomposite to photoradiation reduces the temperature of the inorganic-organic polymer nanocomposite by about 10° C. to about 25° C.

22. A system for regulating temperature of an object, the system comprising:
an inorganic-organic polymer nanocomposite placed proximate to an object, wherein the inorganic-organic polymer nanocomposite comprises a polymeric matrix with a plurality of metal nanoparticles embedded therein, wherein the plurality of metal nanoparticles comprises a plurality of titanium tetra isopropoxide (Ti{OCH(CH$_3$)$_2$}$_4$) nanoparticles, a plurality of tantalum penta-i-propoxide (C$_{15}$H$_3$O$_5$Ta) nanoparticles, a plurality of magnesium isopropoxide (C$_6$H$_{14}$MgO$_2$) nanoparticles, or combinations thereof; and
a source configured to apply photoradiation to the inorganic-organic polymer nanocomposite to regulate the temperature of the inorganic-organic polymer nanocomposite.

23. The system of claim 22, wherein the photoradiation comprises solar radiation.

24. The system of claim 22, wherein the temperature of the inorganic-organic polymer nanocomposite is reduced to from about 10° C. to about 25° C.

* * * * *

UNITED STATES PATENT AND TRADEMARK OFFICE
CERTIFICATE OF CORRECTION

PATENT NO. : 9,926,480 B2  
APPLICATION NO. : 14/524690  
DATED : March 27, 2018  
INVENTOR(S) : Thevasahayam Page 1 of 1

It is certified that error appears in the above-identified patent and that said Letters Patent is hereby corrected as shown below:

In the Specification

In Column 4, Line 37, delete "film 202" and insert -- film 302 --, therefor.

In Column 4, Line 39, delete "film 202" and insert -- film 302 --, therefor.

In Column 4, Line 41, delete "film 202" and insert -- film 302 --, therefor.

In Column 4, Line 45, delete "endpoints)" and insert -- endpoints). --, therefor.

In Column 13, Line 48, delete "recitation no" and insert -- recitation, no --, therefor.

In Column 14, Lines 3-4, delete "general such" and insert -- general, such --, therefor.

In Column 14, Line 11, delete "general such" and insert -- general, such --, therefor.

Signed and Sealed this  
Twenty-ninth Day of May, 2018

Andrei Iancu  
*Director of the United States Patent and Trademark Office*